June 21, 1966  D. R. FRUCHTE ETAL  3,257,149
SEAT PAD FORMATION
Filed Dec. 28, 1964  4 Sheets-Sheet 1

INVENTORS
DONALD R. FRUCHTE
THOMAS K. HOOK
BY
ATTORNEY

June 21, 1966   D. R. FRUCHTE ETAL   3,257,149
SEAT PAD FORMATION
Filed Dec. 28, 1964   4 Sheets-Sheet 2
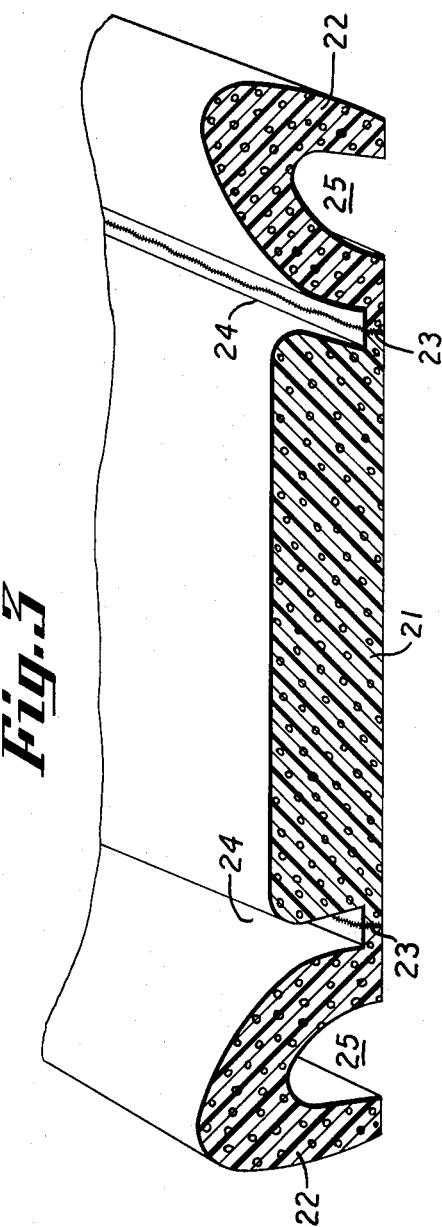
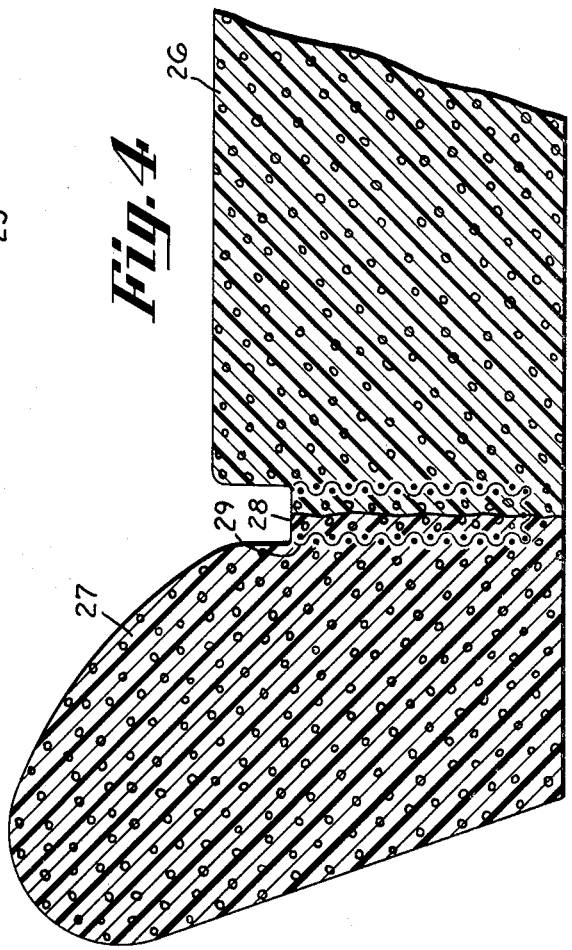
INVENTORS
DONALD R. FRUCHTE
THOMAS K. HOOK
BY
ATTORNEY

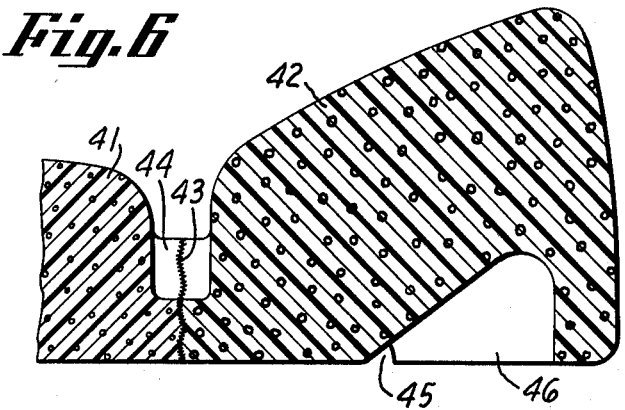
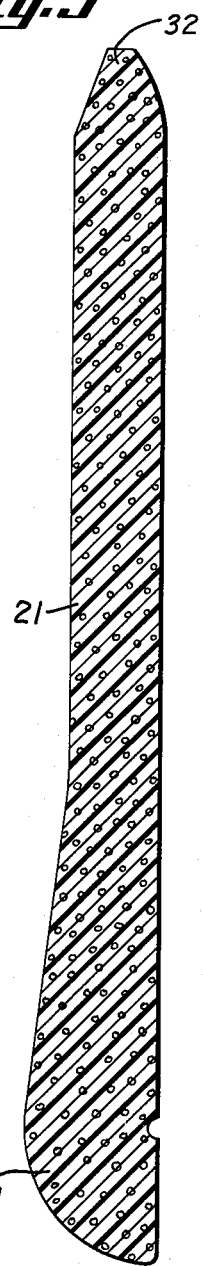
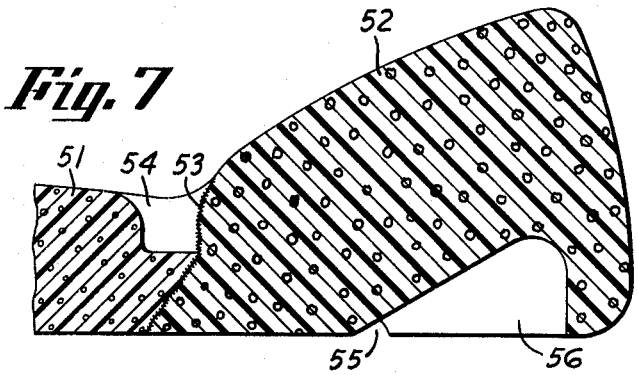

June 21, 1966 D. R. FRUCHTE ETAL 3,257,149
SEAT PAD FORMATION
Filed Dec. 28, 1964 4 Sheets-Sheet 4
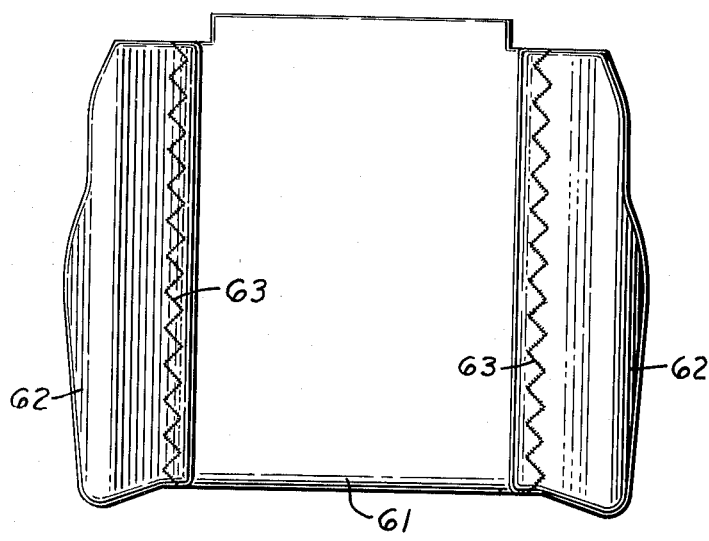
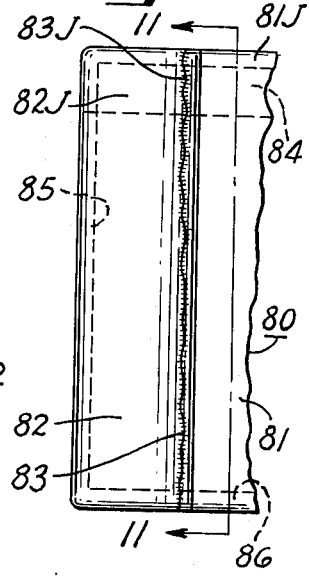
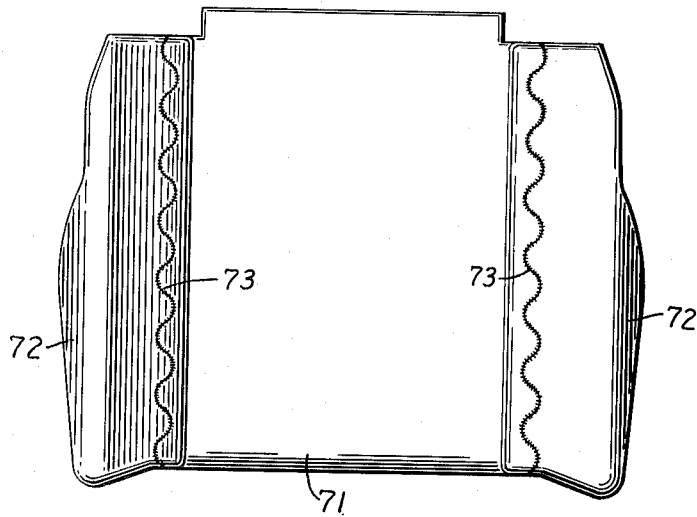
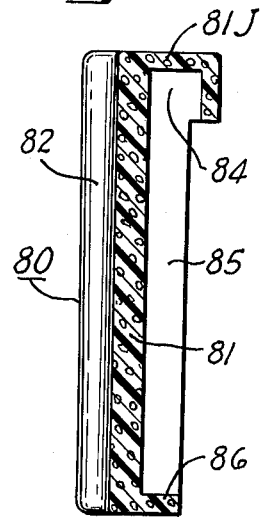
INVENTORS
DONALD R. FRUCHTE
THOMAS K. HOOK
BY
ATTORNEY United States Patent Office 3,257,149
Patented June 21, 1966

3,257,149
SEAT PAD FORMATION
Donald R. Fruchte, Trotwood, and Thomas K. Hook, Dayton, Ohio, assignors to General Motors Corporation, Detroit, Mich., a corporation of Delaware
Filed Dec. 28, 1964, Ser. No. 421,526
6 Claims. (Cl. 297—459)

This invention relates to seat pad formation, and more particularly, to multi-foam bucket seat pad production.

Assembly problems exist for multiple part seat pad structure particularly if attempts are made to leave parts loose or to adhere parts with cement or paste where friction and weight conditions sooner or later cause failure of a juncture therebetween. Accordingly, an object of the present invention is to provide a new and improved bucket seat pad formation having multi-density foam means simultaneously poured and expanded to fill a single mold into a predetermined shape.

Another object of this invention is to provide a bucket seat pad formation having varying hardness and mass density in outer "wing" and inner "seat" areas molded by a multi-foam composite of relatively hard and soft foam compositions respectively including a fused and integrated merging foam portion of reduced thickness therebetween simultaneously in a single mold.

Another object of the present invention is to provide a vehicle bucket seat pad formation including a soft foam inner portion simultaneously made with relatively more rigid foam outer portions along at least opposite sides thereof and including a transition portion optionally having a screen mesh embedded therein or triangularly overlapping in alternate locations.

A further object of this invention is to provide bucket seat pad formation including steps of simultaneously pouring differing density foam materials into a single mold cavity having a predetermined shape to include at least three locations of mass and controlling rising of differing materials simultaneously including a fusing along a juncture of differing materials.

Another object of this invention is to provide bucket seat pad formation including steps of simultaneously pouring differing density foam materials into a single mold cavity having a predetermined shape to include at least three locations of mass and controlling rising of differing materials simultaneously including a fusing along a juncture of differing materials subject to screening and restricting area at this juncture and balancing reaction rates of differing foam materials.

Further objects and advantages of the present invention will be apparent from the following description, reference being had to the accompanying drawings wherein preferred embodiments of the present invention are clearly shown.

In the drawings:

FIGURE 3 is a cross sectional view taken along line 3—3 in FIGURE 2.

FIGURE 4 is a fragmentary enlarged sectional view of seat pad formation further in accordance with the present invention.

FIGURE 5 is a cross-sectional view taken along line 5—5 in FIGURE 2.

FIGURE 6 is a fragmentary enlarged sectional view similar to FIGURE 2.

FIGURE 7 is a fragmentary enlarged sectional view similar to FIGURE 6.

FIGURE 8 is a plan view of a bucket seat pad formation of differing density materials simultaneously poured and cured with a zig-zag juncturing therebetween.

FIGURE 9 is a plan view of a bucket seat pad formation of differing density materials simultaneously poured and cured with a sinusoidal juncturing therebetween.

FIGURE 10 is a fragmentary plan view of a seat rear portion also having features in accordance with the present invention.

FIGURE 11 is a cross-sectional view taken along line 11—11 in FIGURE 10.

Figure 1:
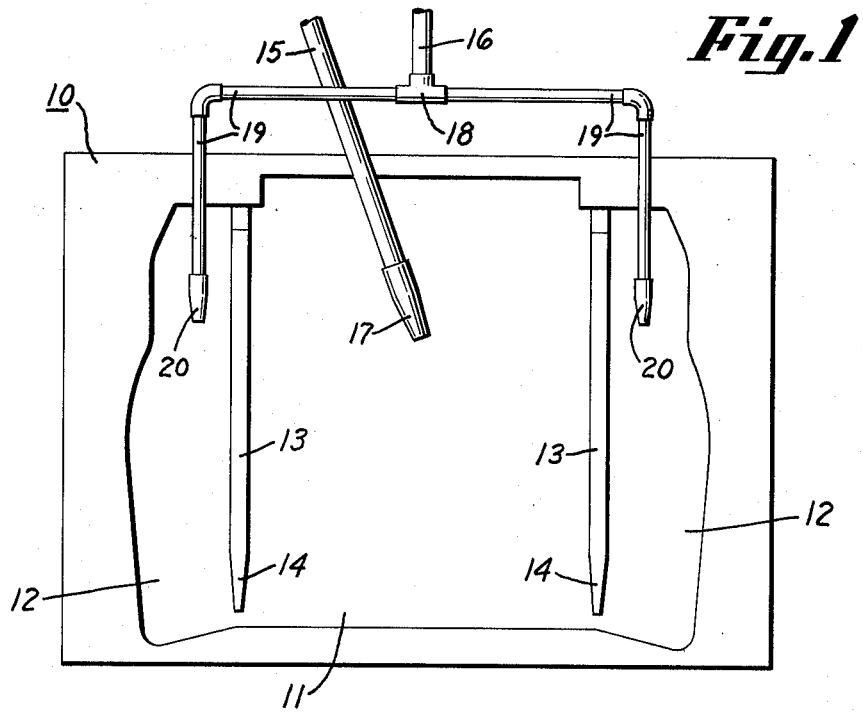
FIGURE 1 shows a single mold with plural nozzles for simultaneously filling differing densities of foam materials for bucket seat pad formation in accordance with the present invention.

In FIGURE 1 there is illustrated equipment generally indicated by numeral 10 representing closable mold means having a central or main cavity portion 11 as well as a pair of "side wing" or auxiliary cavity portions each designated by reference numeral 12. The main cavity portion 11 for formation of a "seat" portion has opposite lateral limits thereof defined by a barrier means 13 each terminating at a forward end with a tapered ending 14. Purpose of such barrier means 13 including the tapered ending 14 thereof will be made more apparent in subsequent description. However, it is to be noted that for mass production purposes, the respective cavity portions 11 and 12 are fed by suitable conduits designated by reference numerals 15 and 16 respectively. The central conduit 15 includes a feeder nozzle portion 17 which is directed to the "seat" or main cavity portion 11. By contrast, the feeder conduit 16 has a dividing juncture or fitting 18 joined by substantially elbow-shaped continuations 19 on opposite sides thereof terminating in a pair of substantially identical "side" or auxiliary nozzle portions 20 which are adapted to discharge soluble material into the "side wing" or auxiliary cavity portions 12.

In accordance with the present invention a relatively soft polymer foam compound is supplied through nozzle means 17 into the central or "seat" cavity portion 11 simultaneously with pouring of a relatively harder polymer foam compound through nozzle means 20 on opposite sides thereof into the "wing" or auxiliary cavity portions 12. The present invention achieves making of a multi foam product by simultaneous pouring of relatively soft and hard foam materials through the nozzle means 17 and 20 simultaneously such that by control of processing and compound variables there is obtained a regulated rise of both foams simultaneously such that a common line at which they meet is at a predetermined location, for example, the barrier or in the area adjacent to the barrier means 13. The regulated rise of the foam materials having soft and hard characteristics from a compound standpoint is achieved by balancing and varying the polymerization and gas generation reactions. As examples of the variables and range in which each of the differing foam portions simultaneously poured and cured has been successfully operated, these figures are to be noted. A material process temperature of substantially 90° F. plus or minus 10° F. for the center foam material and substantially 115° F. plus or minus 10° F. for the side or "wing" foam material can be used. Mold temperature for both the center foam and "wing" foam materials can be given as substantially 100° F. with a range plus or minus 10° F. therefrom. A mixer rate prior to the pouring into the mold portions respectively is exemplified by 3500 r.p.m. plus or minus 1000 r.p.m. for the center foam material and 4000 r.p.m. plus or minus 1000 r.p.m. for the "wing" foam material. A programmed filling of the center foam material can be continuous and that for the "wing" foam material can be in a batch. Time for gel can be variable in a range between 60 and 90 seconds for the center foam material and in a range between 90 and 130 seconds for the "wing" foam material. A weight fill tolerance of plus or minus five percent can be encountered for both the center and "wing" foam materials.

An example of a suitable compound for the relatively soft foam material used in the center section of the seat may be made from the following: 80 parts of a polyoxypropylene adduct of glycerine, which is a triol having a molecular weight of about 3000, a hydroxyl number of 56 and an acid number of about .02; 20 parts of polypropylene glycol, a diol having a molecular weight of 2000, a hydroxyl number of about 56 and an acid number of about .02; 50 parts of toluene diisocyanate comprising an 80-20 mixture of the 2,4 and 2,6 isomers respectively; 2.8 parts of an organo silicone further identified as Union Carbide's L-520, about .37 of a part of stannous octoate, about .20 part of triethylenediamine, about .15 part of triethylamine and 3.82 parts of distilled water. These ingredients are mixed by a conventional one-shot process with 12 parts of F-11 ($CCl_3F$) and the mixture is placed in the mold.

In the above formulation, all parts noted are by weight and it is to be understood that the quantities of stannous octoate, triethylenediamine, and triethylamine may vary slightly according to the ambient conditions and molding requirements in order to get the most satisfactory control conditions.

The compound for the outer portion of the seat, which is more resistant to compression, is made from the same ingredients together with additions of 38 parts of dry barium sulfate powder having an average particle size of 7 microns and .07 of a part of carbon black having channel black surface treated surface area of 145 meters (squared) per gram, a pH of 5 to 7, moisture free 95% fixed carbon and 5% volatiles commercially available as Colloidex No. 3 from Columbian Carbon Corporation. The water addition is preferably reduced to 3.23 parts.

Figure 2:
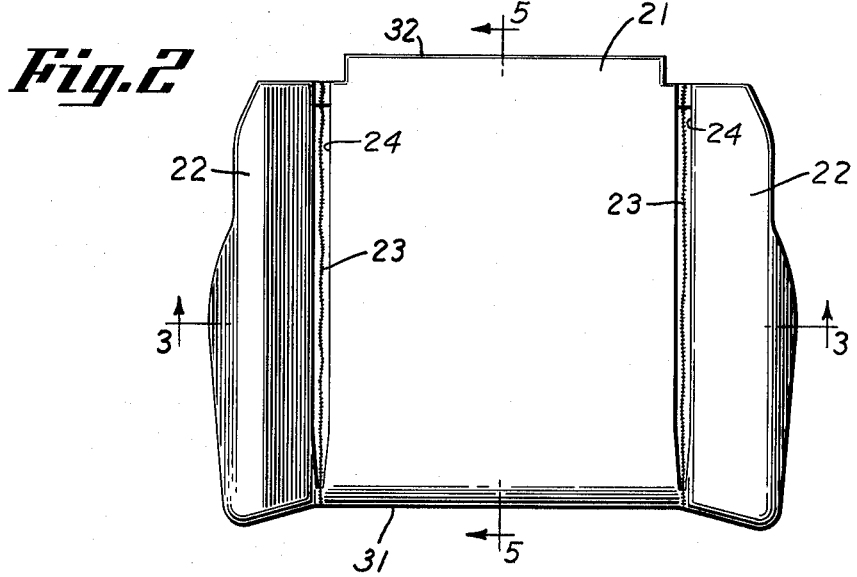
FIGURE 2 is a plan view of a bucket seat pad formation in accordance with the present invention.

The two compounds of relatively soft and hard polymer foam materials are poured together simultaneously in the same mold generally indicated by numeral 10 in FIGURE 1. A lid (not shown) is placed on the mold and a conventional cure follows involving five minutes radiant heating plus substantially ten minutes of hot air. Then a seat pad formation is stripped from the mold and cured an additional two hours at substantially 300° F. Such a seat pad formation is shown in FIGURE 2 of the drawings including a central relatively soft foam seat portion 21 as well as a pair of opposite side wing portions each designated by reference numeral 22. A juncture or fusion and integrating of differing foam materials simultaneously poured and simultaneously cured results in a joining in a pair of substantially parallel areas 23 to one side of a cavity 24 resulting from the barrier 13 and illustrated in views of FIGURES 2 and 3. The side or "wing" portions 22 are relatively harder to achieve a satisfactory trim and bucket seat-type effect such that a suitable border wire can be provided in undercut or grooved areas 25. The recessing 24 can also receive a seam of covering fabric in a well known manner. The relatively hard foam material of the "wing" portions 22 serves to mask any border wire or support from below fitted into the grooves 25 though more firm support is provided thereby without having such border wire being felt through the foam. It is to be noted that in the illustration of FIGURE 1 the increased hardness in the "wing" portions as compared with the center or seat portion has been achieved by using three mixing heads or nozzles and pouring individually from each thereof simultaneously. It is also possible to use a single mixing head and, by a valving arrangement, change the material composition or compounding entering the head to achieve more than one compound. In any event, there is a simultaneous pouring of differing firmness of compounding materials and simultaneous curing thereof to result in a juncture such as designated by reference numeral 23 where there is a fusion and integration of differing foam materials blended to result in a transition of reaction forces in a predetermined width and length substantially adjacent to the barriers 13.

As noted previously, during processing and supply of the differing foam materials the center portion or "seat" relatively soft foam material can be supplied in volume by continuous fill and the "wing" or side portions of foam material can be supplied in a batch fill. Also it is possible for both the center or seat as well as the side or "wing" portions to be supplied in volume by continuous fill for each thereof. Also it is to be understood that the center of relatively soft foam material can be supplied in a batch fill processing while the side or "wing" portions of the relatively harder foam material can be supplied in a continuous fill processing. Continuous fill processing can be achieved with two single streams or a single stream poured to be split to fill tube cavity volumes or locations. In any event two separate foam compounds are used for the relatively soft and harder materials. The reaction rates are balanced to achieve the desired results of control where a fusion of knit line such as 23 occurs.

As a further control for the location of a fusion or knit line reference can be made to an illustration of FIGURE 4 in which a bucket-seat pad formation includes a relatively soft polymer foam material 26 in a center portion of which only a fragment is shown integrated with side wing means 27 of relatively more hard polymer foam material having a fusion or integrated knit occurring along a juncture 28. This juncture or knit line 28 can be isolated more accurately and controlled by provision of a preformed mesh insert or perforated polyethylene films having a thickness in a range between 0.5 and 2.0 mil inches and designated by a reference numeral 29 in FIGURE 4. It is to be understood that this mesh insert or perforated film is a mechanical device which can be supported in the mold by suitable vertical pins, by stretching a string across the mold cavity in a location substantially identical with the location of the barrier 13 or by other means. When the mesh insert or perforated film 29 is provided it is possible to leave a greater thickness along the juncture 28 and this insert or perforated film 29 can have a substantially U-shaped cross section in a pair of locations substantially identical to the parallel grooves 24 previously noted. In the embodiment of FIGURE 4, the undercut or recessing 25 can be eliminated and the relatively hard polymer foam material in the side wing portion 27 can be substantially coextensive.

Regardless of the specific configuration of the juncture or fusion area such as described for FIGURES 3 and 4 of the drawings, it is to be noted that the seat portion such as 21 shown in FIGURE 2 can have a relatively soft polymer foam material continuous through a cross section thereof as indicated by FIGURE 5. The seat portion can be provided with an upwardly curved end surfacing 31 to complement contour of an underside of legs or underneath knee caps of a passenger. A rear or trailing edge of the center "seat" portion 21 can have a tapered configuration 32 offset to one side of the side or "wing" portions of relatively hard polymer foam material and adapted to fit underneath a separable back or upright seat portion (not shown).

In accordance with the present invention it is possible to mold a unitary multi-density bucket seat pad formation per se of urethane foam by pouring simultaneously and curing simultaneously yet having different properties in various sections. It is now possible to produce a bucket seat pad with varying hardness and mass density in the "wing" and "seat" areas. Such multi-density urethane foam molding technique makes it possible to control physical properties such as those of strength including tensile, elongation and tear conditions; hardness such as load deflection conditioning; compression set; density; fatigue loss; cold hardening; surface feel; cell structure; as well as damping characteristics within a range obtainable with urethane foam materials. It is to be understood that for purposes of flow observation during molding, inspection before shipment and quality assurance for a customer, it is desirable also to color differently the various foam pours resulting in the "seat" and "wing" foam portions. Thus a relatively light colored pigmentation can be provided for the "seat" or central relatively soft foam portion compared with a dark or black dye and pigmentation added to the "wing" foam portions of a bucket seat formation.

FIGURES 6, 7, 8 and 9 illustrate variations in the juncture or integrating fusion areas possible when molding relatively soft and hard polymer foam materials simultaneously. In FIGURE 6 there is a fragmentary elevational sectional view to show a soft foam material seat portion 41 integrally joined to a "wing" portion 42 of relatively hard polymer foam material along a fusion line 43. A rear anchoring abutment 44 can be provided together with recessing 45 having a transverse web means 46 integral therewith as represented in FIGURE 6.

FIGURE 7 represents a similar seat pad formation using a relatively soft polymer foam material for a center or "seat" portion 51 joined integrally with a relatively hard foam "wing" portion 52 with a substantially diagonal juncture or fusion knit line 53. Such a slanted or diagonal juncture or knit line 53 can result from having the relatively harder foam material flow below or underneath the overlapping relatively soft foam material as indicated in this sectional view. A recessing groove of slightly less depth together with an end abutment 54 can be provided above the juncture 53 and an undercut or recessing 55 together with intermittent web means 56 can be provided as indicated.

A transition in density along the junction or knit line area can also be programmed into a zig-zag configuration as illustrated in FIGURE 8. In such an embodiment a central or relatively soft polymer foam material for a seat portion 61 can be provided centrally between opposite and complementary wing portions 62 of relatively hard polymer foam material with a zig-zag transition banding 63 representing a progression of difference in densities. Such transition or variation can also have a substantially sinusoidal configuration as represented in FIGURE 9 where there is shown a seat pad formation including a relatively soft polymer foam material center or seat portion 71 in a location intermediate opposite "wing" or elevated side portions 72 having wavy junctures 73 as indicated. Such zig-zag or wavy variation and transition of difference in densities can be accomplished by programmed control of valves and restrictive passages of the nozzle means 17 and 20 for example and also a variation in the blow rate of the differing foam materials can be provided. Also a combination of the rate of speed of nozzle operation and the rate of reaction can be used. The relatively soft foam material used for the center or "seat" portion can have a hardness in a range of between two and three pounds whereas in the sides or "wing" portions a hardness in a range of substantially four and one fourth and four and one half pounds can be provided. These differences in hardness are given merely for purposes of illustration. In any event a juncture or knit line occurs having a gradient portion or zone of gradation of hardness representing a blending between the simultaneously poured and simultaneously cured differing density foam materials. The fusion can occur along such a juncture without any sharp or hard line of demarcation between the materials though the center or "seat" portion will be uniformly bonded to the relatively harder side or "wing" portions without having any sharp line of demarcation where a frictional rubbing could occur between the differing foam materials. Thus the features of the present invention are a definite improvement over the provision of laminates or layers of hard and soft materials even when such layers are cemented together since such layers and laminations per se result in friction along a line of sharp demarcation therebetween and thus the composite thereof is not satisfactory. The use of separate layers or laminations which are placed adjacent to each other and even cemented or bonded to each other by previous methods result in a breaking due to friction in the line of demarcation therebetween and such failure does not occur for the unitary joining of differing foam materials made in situ by simultaneous pouring and simultaneous curing in accordance with the present invention. It is to be noted that by use of the compounding for the "wing" portions it is possible to obtain a hardness therein of substantially 125 pounds per 50 square inches when measured at sixty-five percent deflection. The merger of the differing foam materials in the fusion area without need for cement or separate adhesives where friction would separate differing slabs or layers of pads as previously known results in an improved seat pad formation. The use of principles of control of gel time and expansion rate by compound temperature and molding fill conditions balanced permit pouring simultaneously into the same mold and curing simultaneously therein with proper catalysts. Suitable radiant heating or microwave equipment can be used for curing. It is to be understood that support wiring provided underneath such seat pad formations can be covered with a tape. Use of the barrier or depression such as 13 helps to restrict flow of one foam into the other and a bolster of trim can be fitted therein conveniently. The differing foam materials rise per se and not by compression molding with differing durometer readings yet resulting in a seat integrated into a single unit rather than two foams separate and cemented together.

FIGURE 10 shows a seat back pad means generally indicated by numeral 80 including a central soft foam portion 81 and a pair of relatively more rigid foam side wing portions 82 (only one shown) each fused along a juncture 83 to the central portion as previously described. A top area of the seat back pad includes integral J-shaped extensions 81J and 82J of the portions 81 and 82 respectively. A fused juncture 83J exists therebetween. A cavity 84 to complement seat back or spring frame assembly is formed thereby resulting from simultaneous pouring and curing of differing foam materials. Integral with the side wings are opposite side walls 85 and a cross-over wall 86 along the bottom edge.

It is to be understood that the soft and rigid foam compounding can be modified not only as to hardness but also fatiguing and tensile, tear and elongation or shear strength for both back and seat pad means, the latter being represented in FIGURES 10 and 11.

Both the back and seat pad means have recessing or a slight groove between the wing and central portions in accordance with grooves in the mold to maintain differing compounds separate for foaming to start subject to a rate of rise substantially equal so that the materials do not get out of their predetermined portions appreciably. However, the rising of the foam materials in the center and wing portions is such that a juncture or fused foam weld line occurs with no definite or sharp line of demarcation where there would be sharp difference of shearing effect that is minimized or eliminated due to the transitional area of fusion in accordance with the present invention. There is a gradual transition to avoid such shear. Also it is important to note that the two formulations are poured simultaneously into the mold and allowed to rise simultaneously.

Values of hardness for the center and wing portions are considerably different from each other. The center foam portion for a one and one half inch thickness using a 50 square inch circular indentor has a hardness in a range between 14 and 22 pounds at 25% height deflection and a hardness in a range between 40 and 54 pounds at 65% deflection. For the wing portions on 1.5 inch thickness of the foam material thereof using only a 5 square inch circular indentor at 25% deflection there is a hardness range from 3 to 5 pounds and at 65% deflection a range between 10 and 16 pounds hardness.

It is to be understood that these values are for the example compounding given as a working material though people familiar with foam formulations can vary hardness by variation of ingredients. For example, increase of barium sulfate powder with appropriate variation of water content can result in differing values of hardness for the wing portions.

While the embodiments of the present invention herein disclosed constitute preferred forms, it is to be understood that other forms might be adopted.

What is claimed is as follows:

1. A vehicle bucket seat pad formation comprising, a unitary mass of foam materials having varying hardness and mass density including a relatively soft inner seat portion, a pair of outer wing portions more rigid than said soft inner seat portion, and an integrated merging foam fusion portion of reduced thickness therebetween, said integrated merging foam fusion portion of reduced thickness being located on each side in diverging angular relation, said more rigid wing portions in part extending underneath said soft inner seat portion at transition of said integrated merging foam fusion portion.

2. The formation of claim 1 wherein each of said opposite integrated fusion portions has a substantially zig-zag configuration.

3. The formation of claim 1 wherein each of said opposite integrated fusion portions has a substantially sinusoidal configuration.

4. The formation of claim 1 wherein each of said opposite integrated fusion portions includes screen means embedded therein for restriction of interflow of said soft and more rigid portions.

5. The formation of claim 4 wherein said screen means on each of opposite sides has a U-shaped channel configuration.

6. The formation of claim 1 wherein said foam fusion portion as well as said inner portion and said outer wing portions as a composite at one end extend into a substantially J-shaped area with a cavity thereunder formed collectively by said inner and outer portions as a seat back pad means.

References Cited by the Examiner
UNITED STATES PATENTS

| | | | |
|---|---|---|---|
| 2,845,997 | 8/1958 | Waite | 297—455 |
| 3,043,627 | 7/1962 | Torjusen | 297—456 |
| 3,081,131 | 3/1963 | Brueder | 297—455 |
| 3,082,486 | 3/1963 | Khawan et al. | 264—45 |
| 3,084,980 | 4/1963 | Lawson | 297—455 |
| 3,112,987 | 12/1963 | Griffiths et al. | 264—45 |
| 3,161,436 | 12/1964 | Hood | 297—460 |
| 3,175,863 | 3/1965 | Hood | 297—455 |

FRANK B. SHERRY, *Primary Examiner.*

C. A. NUNBERG, *Assistant Examiner.*